US007296028B1

(12) United States Patent
Ivanova

(10) Patent No.: US 7,296,028 B1
(45) Date of Patent: Nov. 13, 2007

(54) SYSTEM AND METHOD FOR MAPPING OBJECT-ORIENTED PROGRAM CODE TO A DATABASE LAYER

(75) Inventor: Viktoriya Ts Ivanova, Sofia (BG)

(73) Assignee: SAP AG, Walldorf (DE)

( * ) Notice: Subject to any disclaimer, the term of this patent is extended or adjusted under 35 U.S.C. 154(b) by 429 days.

(21) Appl. No.: 10/837,399

(22) Filed: Apr. 30, 2004

(51) Int. Cl.
*G06F 17/30* (2006.01)

(52) U.S. Cl. .................. 707/100; 707/102; 707/103 R

(58) Field of Classification Search .................... None
See application file for complete search history.

(56) References Cited

U.S. PATENT DOCUMENTS

| | | | | |
|---|---|---|---|---|
| 4,841,434 | A | 6/1989 | Mathewes et al. | |
| 5,499,371 | A * | 3/1996 | Henninger et al. | 717/108 |
| 5,878,407 | A | 3/1999 | Olgac | |
| 6,714,943 | B1 | 3/2004 | Ganesh et al. | |
| 6,728,719 | B1 | 4/2004 | Ganesh et al. | |
| 6,912,569 | B1 | 6/2005 | Sharma et al. | |
| 6,980,988 | B1 | 12/2005 | Demers et al. | |
| 2002/0035673 | A1 | 3/2002 | Roseborough et al. | |
| 2002/0040409 | A1 | 4/2002 | Matena et al. | |
| 2002/0049603 | A1 | 4/2002 | Mehra et al. | |
| 2002/0069157 | A1 * | 6/2002 | Jordan | 705/37 |
| 2002/0152422 | A1 | 10/2002 | Sharma et al. | |
| 2003/0058277 | A1 | 3/2003 | Bowman et al. | |
| 2003/0120659 | A1 | 6/2003 | Sridhar | |
| 2003/0163479 | A1 | 8/2003 | Mathews et al. | |
| 2003/0172091 | A1 | 9/2003 | Norcott | |
| 2003/0182461 | A1 | 9/2003 | Stelting et al. | |
| 2004/0133487 | A1 | 7/2004 | Hanagan et al. | |
| 2004/0172385 | A1 | 9/2004 | Dayal | |
| 2005/0033730 | A1 | 2/2005 | Chaudhuri et al. | |
| 2005/0050068 | A1 | 3/2005 | Vaschillo et al. | |
| 2005/0240556 | A1 | 10/2005 | Larson et al. | |
| 2005/0240577 | A1 | 10/2005 | Larson et al. | |

OTHER PUBLICATIONS http://jaffa.sourceforge.net/documentation/persistence/engines.html Last Modified: Thu Jun. 26, 2003 at 6:05:27pm.*
http://www.java2s.com/Code/Java/Database-SQL-JDBC/Createtabledatatype.htm Copyright 2003—04 Demo Source and Support.*

(Continued)

*Primary Examiner*—Jeffrey Gaffin
*Assistant Examiner*—Tomasz Ponikiewski
(74) *Attorney, Agent, or Firm*—Blakely, Sokoloff, Taylor & Zafman, LLP

(57) ABSTRACT

One embodiment of the invention employs techniques for providing a default object-relational mapping between persistent data objects (i.e., the objects that represent persistent data from a database) and a relational database. In a Java environment, for example, each entity bean is mapped to a particular database table, and each of the persistent fields within the entity bean are mapped to columns of the database table. Relationships between entity beans are expressed as mappings between primary keys and foreign keys within the database schema. Dependent-value persistent fields may be mapped to multiple columns or to a single column of a special Java type (java.sql.Types. BLOB). In addition, one embodiment of the invention generates a default database schema using the default O/R mapping by executing a series of SQL commands generating the tables and columns.

24 Claims, 15 Drawing Sheets

OTHER PUBLICATIONS http://www.cafeaulait.org/course/week4/53.html, Mar. 8, 2003 2 pages.

http://www.dev.mysql.com/doc/refman/4.1/en/char.html, accessed Oct. 31, 2006 3 pages.

http://www.cocoon.apache.org/2.0/userdocs/readers/database-reader.html Dec. 25, 2002, 3 pages.

http://www.java.sun.com/j2se/1.3/docs/api/java/sql/Blob.html, 2001 4 pages.

http://www.en.wikipedia.org/wiki/Constructor_%28computer_science%29, accessed Oct. 31, 2006, 3 pages.

http://e-docs.bea.com/wls/docs81/index.html, printed on Jun. 29, 2007 3 pages.

http://www.oracle.com/technology/tech/index, printed Jun. 29, 2007 2 pages.

Ragae Ghaly and Krishna Kothapalli, "SAMS Teach Yourself EJB in 21 Days" 2003, pp. 353-376.

* cited by examiner

```
<?xml version="1.0" encoding="UTF-8"?>
<!DOCTYPE ejb-jar PUBLIC "-//Sun Microsystems, Inc.//DTD Enterprise JavaBeans
2.0//EN" "http://java.sun.com/dtd/ejb-jar_2_0.dtd">
<ejb-jar>
      <description>EJB JAR description</description>
      <display-name>EJB JAR</display-name>
      <enterprise-beans>
            <entity>
401               <ejb-name>OrderBean</ejb-name>
                  <home>shopping.OrderHome</home>
                  <remote>shopping.Order</remote>
                  <local-home>shopping.OrderLocalHome</local-home>
                  <local>shopping.OrderLocal</local>
                  <ejb-class>shopping.OrderBean</ejb-class>
                  <persistence-type>Container</persistence-type>
                  <prim-key-class>java.lang.Integer</prim-key-class>
                  <reentrant>False</reentrant>
                  <cmp-version>2.x</cmp-version>
                  <abstract-schema-name>OrderBean</abstract-schema-name>
410               <cmp-field>
                        <field-name>orderId</field-name>
                  </cmp-field>
411               <cmp-field>
                        <field-name>orderDate</field-name>
                  </cmp-field>
412               <cmp-field>
                        <field-name>creditApproved</field-name>
                  </cmp-field>
413               <cmp-field>
                        <field-name>orederStatus</field-name>
                  </cmp-field>

414               <primkey-field>orderId</primkey-field>
            </entity>
            <entity>
402               <ejb-name>CustomerBean</ejb-name>
                  <home>shopping.CustomerHome</home>
                  <remote>shopping.Customer</remote>
                  <local-home>shopping.CustomerLocalHome</local-home>
                  <local>shopping.CustomerLocal</local>
                  <ejb-class>shopping.CustomerBean</ejb-class>
                  <persistence-type>Container</persistence-type>
                  <prim-key-class>java.lang.Long</prim-key-class>
                  <reentrant>False</reentrant>
                  <cmp-version>2.x</cmp-version>
                  <abstract-schema-name>CustomerBean</abstract-schema-name>
                  <cmp-field>
                        <field-name>ssn</field-name>
                  </cmp-field>
                  <cmp-field>
                        <field-name>age</field-name>
                  </cmp-field>
```

*Fig 4a*
*(prior art)*

```
            <cmp-field>
                  <field-name>firstName</field-name>
            </cmp-field>
            <cmp-field>
                  <field-name>lastName</field-name>
            </cmp-field>
            <primkey-field>ssn</primkey-field>
415       </entity>
          <entity>
            <ejb-name>ProductBean</ejb-name>
403         <home>shopping.ProductHome</home>
            <remote>shopping.Product</remote>
            <local-home>shopping.ProductLocalHome</local-home>
            <local>shopping.ProductLocal</local>
            <ejb-class>shopping.ProductBean</ejb-class>
            <persistence-type>Container</persistence-type>
            <prim-key-class>java.lang.String</prim-key-class>
            <reentrant>False</reentrant>
            <cmp-version>2.x</cmp-version>
            <abstract-schema-name>ProductBean</abstract-schema-name>
            <cmp-field>
                  <field-name>name</field-name>
            </cmp-field>
            <cmp-field>
                  <field-name>productId</field-name>
            </cmp-field>
            <cmp-field>
                  <field-name>price</field-name>
            </cmp-field>
            <primkey-field>productId</primkey-field>
416       </entity>
        </enterprise-beans>

        <relationships>
405       <description>
          </description>
          <ejb-relation>
406         <description>description</description>
            <ejb-relation-name>Order-Customer</ejb-relation-name>
            <ejb-relationship-role>
                  <ejb-relationship-role-name>shopping.OrderBean</ejb-
                  relationship-role-name>
                  <multiplicity>One</multiplicity>
                  <relationship-role-source>
430                     <ejb-name>OrderBean</ejb-name>
                  </relationship-role-source>
                  <cmr-field>
                        <cmr-field-name>customer</cmr-field-name>
                  </cmr-field>
            </ejb-relationship-role>
            <ejb-relationship-role>
```

*Fig 4b*

*(prior art)*

```
                    <ejb-relationship-role-name>shopping.CustomerBean</ejb-
                    relationship-role-name>
                    <multiplicity>Many</multiplicity>
               431  <relationship-role-source>
                         <ejb-name>CustomerBean</ejb-name>
                    </relationship-role-source>
               </ejb-relationship-role>
          </ejb-relation>

          <ejb-relation>
     407       <description>description</description>
               <ejb-relation-name>Order-Product</ejb-relation-name>
               <ejb-relationship-role>
                    <ejb-relationship-role-name>shopping.OrderBean</ejb-
                    relationship-role-name>
                    <multiplicity>Many</multiplicity>
                    <relationship-role-source>
                         <ejb-name>OrderBean</ejb-name>
                    </relationship-role-source>
                    <cmr-field>
                         <cmr-field-name>products</cmr-field-name>
                         <cmr-field-type>java.util.Collection</cmr-field-type>
                    </cmr-field>
               </ejb-relationship-role>
               <ejb-relationship-role>
                    <ejb-relationship-role-name>shopping.ProductBean</ejb-
                    relationship-role-name>
                    <multiplicity>Many</multiplicity>
                    <relationship-role-source>
                         <ejb-name>ProductBean</ejb-name>
                    </relationship-role-source>
               </ejb-relationship-role>
          </ejb-relation>
     </relationships>
</ejb-jar>
```

*Fig 4c*
*(prior art)*

```
<?xml version="1.0" encoding="UTF-8"?>
<!DOCTYPE persistent-ejb-map SYSTEM "persistent.dtd">
<persistent-ejb-map>
      <locking
            type="Table"/>
      <db-properties>
            <data-source-name>CONFIG_DB</data-source-name>
      </db-properties>
      <entity-beans>
            <entity-bean>
801               <ejb-name>OrderBean</ejb-name>
      810         <table-name>OrderBean0</table-name>
      811         <field-map
                        key-type="PrimaryKey">
         812            <field-name>orderId</field-name>
                        <column>
                              <column-name>orderId_0</column-name>
                        </column>
                  </field-map>
                  <field-map
      813               key-type="NoKey">
                        <field-name>orderDate</field-name>
                        <column>
                              <column-name>orderDate_0</column-name>
                        </column>
                  </field-map>
                  <field-map
                        key-type="NoKey">
      814               <field-name>creditApproved</field-name>
                        <column>
                              <column-name>creditApproved_0</column-name>
                        </column>
                  </field-map>
                  <field-map
                        key-type="NoKey">
       815              <field-name>orderStatus</field-name>
                        <column>
                              <column-name>orderStatus_0</column-name>
                        </column>
                  </field-map>
            </entity-bean>
            <entity-bean>
802               <ejb-name>CustomerBean</ejb-name>
                  <table-name>CustomerBean1</table-name>
                  <field-map
                        key-type="PrimaryKey">
                        <field-name>ssn</field-name>
                        <column>
                              <column-name>ssn_0</column-name>
                        </column>
```

*Fig 8a*

```
                </field-map>
                <field-map
                      key-type="NoKey">
                      <field-name>age</field-name>
                      <column>
                            <column-name>age_0</column-name>
                      </column>
                </field-map>
                <field-map
                      key-type="NoKey">
                      <field-name>firstName</field-name>
                      <column>
                            <column-name>firstName_0</column-name>
                      </column>
                </field-map>
                <field-map
                      key-type="NoKey">
                      <field-name>lastName</field-name>
                      <column>
                            <column-name>lastName_0</column-name>
                      </column>
                </field-map>
          </entity-bean>
          <entity-bean>
803             <ejb-name>ProductBean</ejb-name>
                <table-name>ProductBean2</table-name>
                <field-map
                      key-type="NoKey">
                      <field-name>name</field-name>
                      <column>
                            <column-name>name_0</column-name>
                      </column>
                </field-map>
                <field-map
                      key-type="PrimaryKey">
                      <field-name>productId</field-name>
                      <column>
                            <column-name>productId_0</column-name>
                      </column>
                </field-map>
                <field-map
                      key-type="NoKey">
                      <field-name>price</field-name>
                      <column>
                            <column-name>price_0</column-name>
                      </column>
                </field-map>
          </entity-bean>
    </entity-beans>
```

*Fig 8b*

```
<relationships>
            <table-relation>
805                <table-relationship-role
                      key-type="PrimaryKey">
                      <ejb-name>OrderBean</ejb-name>
                      <cmr-field>customers</cmr-field>
                   </table-relationship-role>
                   <table-relationship-role
                      key-type="NoKey">
                      <ejb-name>CustomerBean</ejb-name>
                        <fk-column>
                          <column-name>
                            orderId_0_0
                          </column-name>
                          <pk-field-name>
                            orderId
                          </pk-field-name>
                        </fk-column>
                   </table-relationship-role>
            </table-relation>
            <table-relation>
806                <help-table>ProductBean_OrderBean_1</help-table>
                   <table-relationship-role
       822            key-type="PrimaryKey">
                      <ejb-name>OrderBean</ejb-name>
                      <cmr-field>products</cmr-field>
                      <fk-column>
                            <column-name>orderId_0_0_1</column-name>
                            <pk-field-name>orderId</pk-field-name>
                      </fk-column>
                   </table-relationship-role>
                   <table-relationship-role
       823            key-type="PrimaryKey">
                      <ejb-name>ProductBean</ejb-name>
                      <fk-column>
                            <column-name>productId_0_2_1</column-name>
                            <pk-field-name>productId</pk-field-name>
                      </fk-column>
                   </table-relationship-role>
            </table-relation>
      </relationships>
</persistent-ejb-map>
```

*Fig 8c*

| JDBC Type | DB2 for UNIX and NT V8.1 | DB2 for OS/390 V7.1 | DB2 for AS/400 V5R2 | MS SQL Server 2000 | Oracle 9i | SAP DB 7.4 |
|---|---|---|---|---|---|---|
| VARCHAR(N) 1 <= N <= 127 | VARCHAR(N*3) | VARGRAPHIC(N) CCSID 1200 | VARGRAPHIC(N) CCSID 13488 | NVARCHAR (N) | NVARCHAR 2(N) | VARCHAR(N) UNICODE |
| LONGVARCHAR(N) 1 <= N <= 1333 | VARCHAR(N*3) | VARGRAPHIC(N) CCSID 1200 | VARGRAPHIC(N) CCSID 13488 | NVARCHAR (N) | NVARCHAR 2(N) | VARCHAR(N) UNICODE |
| BINARY(N) 1 <= N <= 255 | VARCHAR(N) FOR BIT DATA | CHAR(N) FOR BIT DATA | CHAR(N) FOR BIT DATA | BINARY(N) | RAW(N) | CHAR(N) BYTE |
| LONGVARBINARY(N) 1 <= N <= 2000 | VARCHAR(N) FOR BIT DATA | VARCHAR(N) FOR BIT DATA | VARCHAR(N) FOR BIT DATA | VARBINAR Y(N) | RAW(N) | LONG BYTE |
| SMALLINT | SMALLINT | SMALLINT | SMALLINT | SMALLINT | SMALLINT | SMALLINT |
| INTEGER | INTEGER | INTEGER | INTEGER | INTEGER | INTEGER | INTEGER |
| BIGINT | BIGINT | NUMERIC(19) | BIGINT | BIGINT | NUMBER(19 ) | FIXED(19) |
| DECIMAL (P,[S]) | DECIMAL(P[,S]) | DECIMAL(P[,S]) | DECIMAL(P[,S]) | DECIMAL(P[ ,S]) | NUMBER(P[, S]) | FIXED(P[,S]) |
| REAL | REAL | REAL | REAL | REAL | REAL | REAL |
| DOUBLE | DOUBLE | DOUBLE | DOUBLE | FLOAT(53) | FLOAT | FLOAT |
| DATE | DATE | DATE | DATE | DATETIME | DATE | DATE |
| TIME | TIME | TIME | TIME | DATETIME | DATE | TIME |
| TIMESTAMP | TIMESTAMP | TIMESTAMP | TIMESTAMP | DATETIME | TIMESTAMP | TIMESTAMP |
| CLOB | CLOB(N*3) | DBCLOB CCSID 1200 | DBCLOB(N) CCSID 13488 | NTEXT | NCLOB | LONG UNICODE |
| BLOB | BLOB(N) | BLOB | BLOB(N) | IMAGE | BLOB | LONG BYTE |

*Fig. 10*

SYSTEM AND METHOD FOR MAPPING OBJECT-ORIENTED PROGRAM CODE TO A DATABASE LAYER

BACKGROUND

1. Field of the Invention

This invention relates generally to the field of data processing systems. More particularly, the invention relates to a system and method for mapping objects within an object-oriented environment to a database schema and for automatically generating a database schema.

2. Description of the Related Art

Multi-Tier Enterprise Computing Systems

Java 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

FIG. 1 illustrates an exemplary J2EE application server 100 in which the presentation layer is implemented as a Web container 111 and the business layer is implemented as an Enterprise Java Bean ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors (described in greater detail below).

As illustrated in FIG. 1, each layer of the J2EE architecture includes multiple containers. The Web container 111, for example, is itself comprised of a servlet container 115 for processing servlets and a Java Server Pages ("JSP") container 116 for processing Java server pages. The EJB container 101 includes three different containers for supporting three different types of enterprise Java beans: a session bean container 105 for session beans, an entity bean container 106 for entity beans, and a message driven bean container 107 for message driven beans. A more detailed description of J2EE containers and J2EE services can be found in Ragae Ghaly and Krishna Kothapalli, SAMS Teach Yourself EJB in 21 DAYS (2003) (see, e.g., pages 353-376).

Persistence and Enterprise Java Beans

The information systems of a modern day enterprise (such as a corporation or government institution) are often responsible for managing and performing automated tasks upon large amounts of data. Persistent data is that data that "exists" for extended periods of time (i.e., it "persists"). Persistent data is typically stored in a database so that it can be accessed as needed over the course of its existence. Here, complex "database software" (e.g., such as DB2, Oracle, and SQL Server) is often used to read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction."

FIG. 2 illustrates the manner in which persistent data is managed in current J2EE environments. Session beans 255-257 comprise the high level workflow and business rules implemented by the application server 100. For example, in a customer relationship management ("CRM") system, session beans define the business operations to be performed on the underlying customer data (e.g., calculate average customer invoice dollars, plot the number of customers over a given timeframe, . . . etc).

Session beans typically execute a single task for a single client during a "session." Two versions of session beans exist: "stateless" session beans and "stateful" session beans. As its name suggests, a stateless session bean interacts with a client without storing the current state of its interaction with the client. By contrast, a stateful session bean stores its state across multiple client interactions.

Entity beans are persistent objects which represent data (e.g., customers, products, orders, . . . etc) stored within a database 223. Typically, each entity bean 252 is mapped to a table 260 in the relational database and, as indicated in FIG. 2, each "instance" of the entity bean is typically mapped to a row in the table (referred to generally as an "object-relational mapping"). Two different types of persistence may be defined for entity beans: "bean-managed persistence" and "container-managed persistence." With bean-managed persistence, the entity bean designer must provide the code to access the underlying database (e.g., SQL Java and/or JDBC commands). By contrast, with container-managed persistence, the EJB container 101 manages the underlying calls to the database.

Each EJB consists of "remote home" and/or "local home" interface and "remote component" and/or "local component" interface, and one class, the "bean" class. The home interface lists the methods available for creating, removing and finding EJBs within the EJB container. The home object is the implementation of the home interface and is generated by the EJB container at deploy time. The home object is used by clients to identify particular components and establish a connection to the components' interfaces. The component interfaces provides the underlying business methods offered by the EJB.

Entity Bean Deployment

A "deployment descriptor" is an XML file (named "ejb-jar.xml") that describes how entity beans are deployed within the J2EE application server 100. For each CMP entity bean, the deployment descriptor defines "persistent fields" which represent and store a single unit of data, and "relationship" fields which represent and store references to other entity beans. Relationship fields are analogous to foreign keys used in relational database tables. Relationships between entity beans may be defined as "one-to-one" where each entity bean is associated with a single instance of another entity bean, "one-to-many" where each entity bean is associated with many instances of another entity bean, or "many-to-many" where entity bean instances may be related to multiple instances of each other.

An exemplary object model of three entity beans is illustrated in FIG. 3 and an exemplary deployment descriptor describing the three entity beans is illustrated in FIGS. 4*a*-*c*. The entity beans include a product entity bean 303 representing one or more products, an order entity bean 301 representing a business order and a customer entity bean 302 representing a customer. As indicated in FIG. 3, a many-to-many relationship exists between the product bean 303 and the order bean 301 (i.e., many different product may be used in many different orders). Similarly, a one-to-many relationship exists between the customer bean 302 and the order bean 301 (i.e., an individual customer may make multiple orders).

The container-managed persistence ("CMP") fields of the product bean 301 include product Name, Product ID, and Price (identifying the name product identification code and price, respectively, of each product). The CMP fields for the order bean 302 include Order ID, Order Date, Credit Approved (indicating whether the user's credit card company approved the order) and Order Status; and the CMP fields for the customer bean 303 include social security number (SSN), Age, First Name and Last Name of the customer.

The deployment descriptor illustrated in FIGS. 4*a-c* includes separate sections 401-403 representing and describing the CMP fields for each entity bean 301-303, respectively. For example, section 401 includes four entries 410-413 (identified by the <cmp-field> XML tags) identifying each of the order entity bean's CMP fields (i.e., Order ID, Order Date, Credit Approved, and Order Status). Entity bean sections 402-403 include similar entries identifying CMP fields. In addition, for each entity bean, one particular CMP field is identified as the primary key field using the <primkey-field> tag 414-416 (e.g., Order ID for the order bean 301).

A <relationships> section 405 of the deployment descriptor (see FIG. 4*b*) defines the relationships between each of the entity beans 301-303. Each entity bean relationship is defined under a separate <ejb-relation> tag 406, 407. For example, the one-to-many relationship between the order bean 301 and the customer bean 302 is described by setting the <multiplicity> tag 430 associated with the order bean 301 to "many" and setting the <multiplicity> tag 431 associated with the customer bean 302 to "one." Similar descriptions are provided under <ejb-relation> tag 407 to define the many-to-many relationship between the order bean 301 and the product bean 303.

Thus, the standard deployment descriptor, ejb-jar.xml, defines the various CMP fields for each entity bean and the relationships between entity beans. However, no standard mechanism exists for specifying how the various CMP fields and relationships are mapped to relational database tables. In addition, no standard mechanisms exist for generating a database schema which matches the object schema of an existing object-oriented application.

SUMMARY

One embodiment of the invention employs techniques for providing a verification of an object-relational ("O/R") mapping between persistent data objects (i.e., the objects that represent persistent data) and relational database objects. In one embodiment, Each entity bean is mapped to a particular database table, and each of the persistent fields within the entity bean are mapped to columns of the database table. Relationships between entity beans are expressed as a mapping between primary keys and foreign keys within the database schema. Dependent-value persistent fields are mapped to multiple columns or to a single column of a special JDBC API type (java.sql.Types. BLOB). In addition, one embodiment of the invention verifies the accuracy of an existing database schema given a particular O/R mapping.

BRIEF DESCRIPTION OF THE DRAWINGS

A better understanding of the present invention can be obtained from the following detailed description in conjunction with the following drawings, in which:

FIGS. 4*a-c* illustrates an exemplary deployment descriptor employed within a J2EE environment.

FIG. 8*a-c* illustrates an exemplary object-relational persistence description generated by embodiments of the invention.

FIG. 10 illustrates data types for different database systems.

DETAILED DESCRIPTION OF PREFERRED EMBODIMENTS

Described below is a system and method for mapping persistent object-oriented data to a database within an enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

An Apparatus and Method for Mapping Object-Oriented Program Code to a Database One embodiment of the invention automatically generates a default object-relational mapping between an object-oriented application and a database. Specifically, in one embodiment, a mapping tool analyzes the abstract schema of the application (e.g., as defined in an ejb-jar.xml file) and generates an object-relational mapping, thereby freeing the bean developer from creating O/R mapping descriptors. In addition, one embodiment of the invention automatically generates a relational database schema that matches the abstract schema described within the application's deployment descriptor. Yet another embodiment employs techniques for verifying an existing object-relational mapping by comparing the object-relational mapping against an existing database schema. Within a J2EE environment, each of the foregoing features may be integrated within an EJB container of the J2EE server.

Figure 5A:
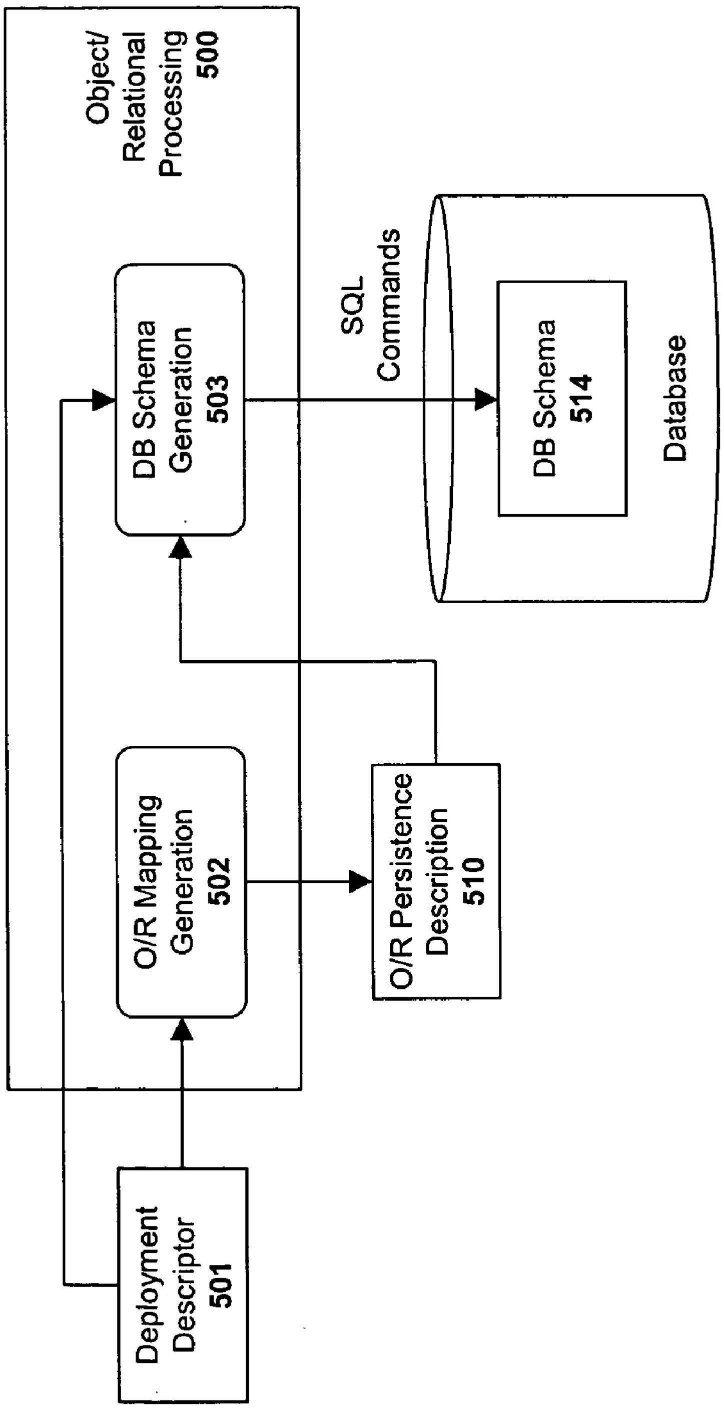
FIG. 5*a* illustrates one embodiment of a system for generating a default object-relational mapping and a default database schema.

FIG. 5*a* illustrates one embodiment of the invention which includes an object/relational ("O/R") processing module 500 comprised of O/R mapping generation logic 502 for generating a default O/R mapping, and database schema generation logic 503 for automatically generating a default database schema. As indicated in FIG. 5*a*, the O/R mapping logic 502 generates an O/R persistence description 510 based on its analysis of the deployment descriptor 501 of an application. In the embodiments of the invention described below the O/R persistence description 510 is an Extensible Markup Language ("XML") file (e.g., persistent.xml). However, the underlying principles of the invention are not limited to any particular file type.

Figure 6:
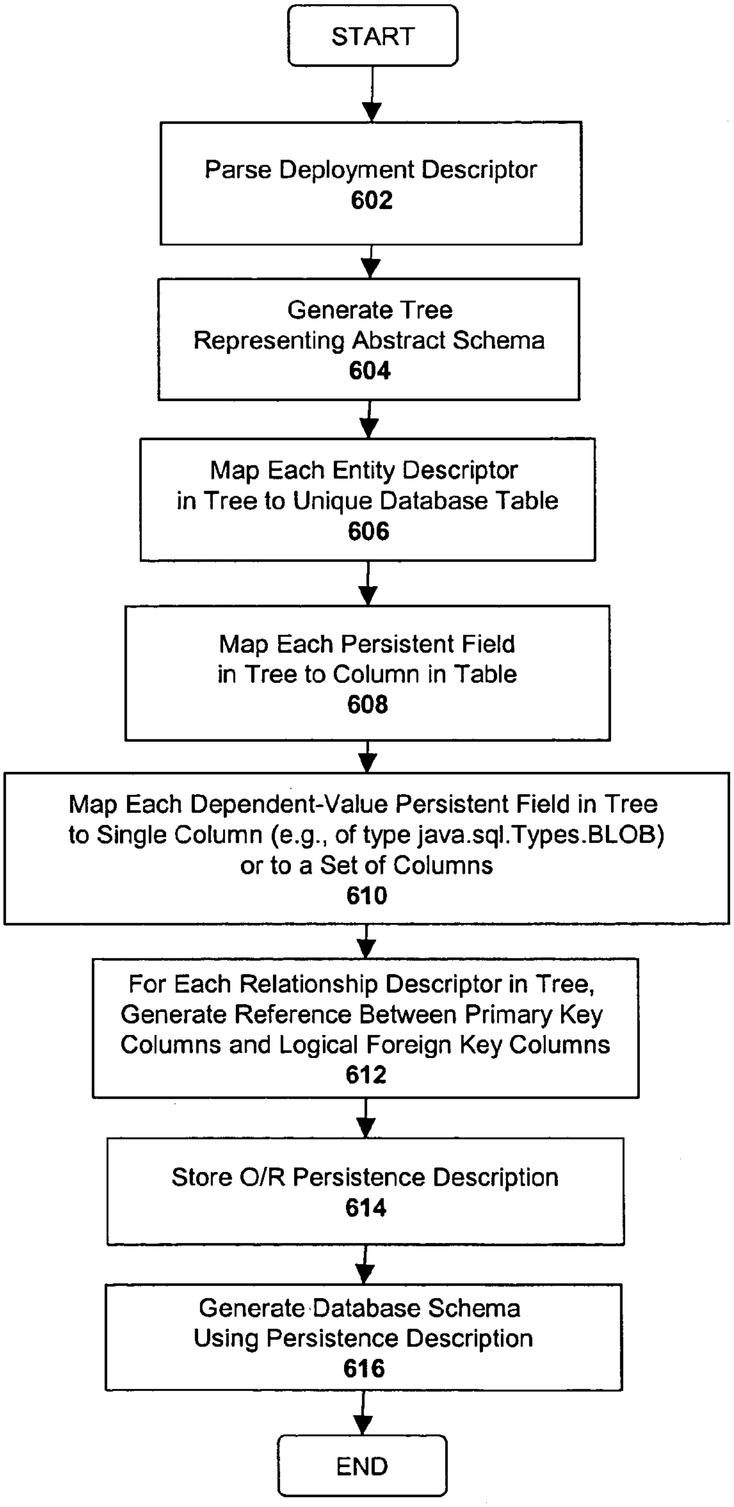
FIG. 6 illustrates one embodiment of a method for generating a default object-relational mapping and a default database schema.

In one embodiment, the O/R mapping generation logic 502 operates according to the method shown in FIG. 6 to generate the default O/R mapping for a given application. At 602, the O/R mapping generation logic 502 parses the deployment descriptor 501 to determine the abstract schema of the application. At 604, the O/R mapping generation logic 502 generates a hierarchical tree representing the abstract schema of the application.

Figure 7:
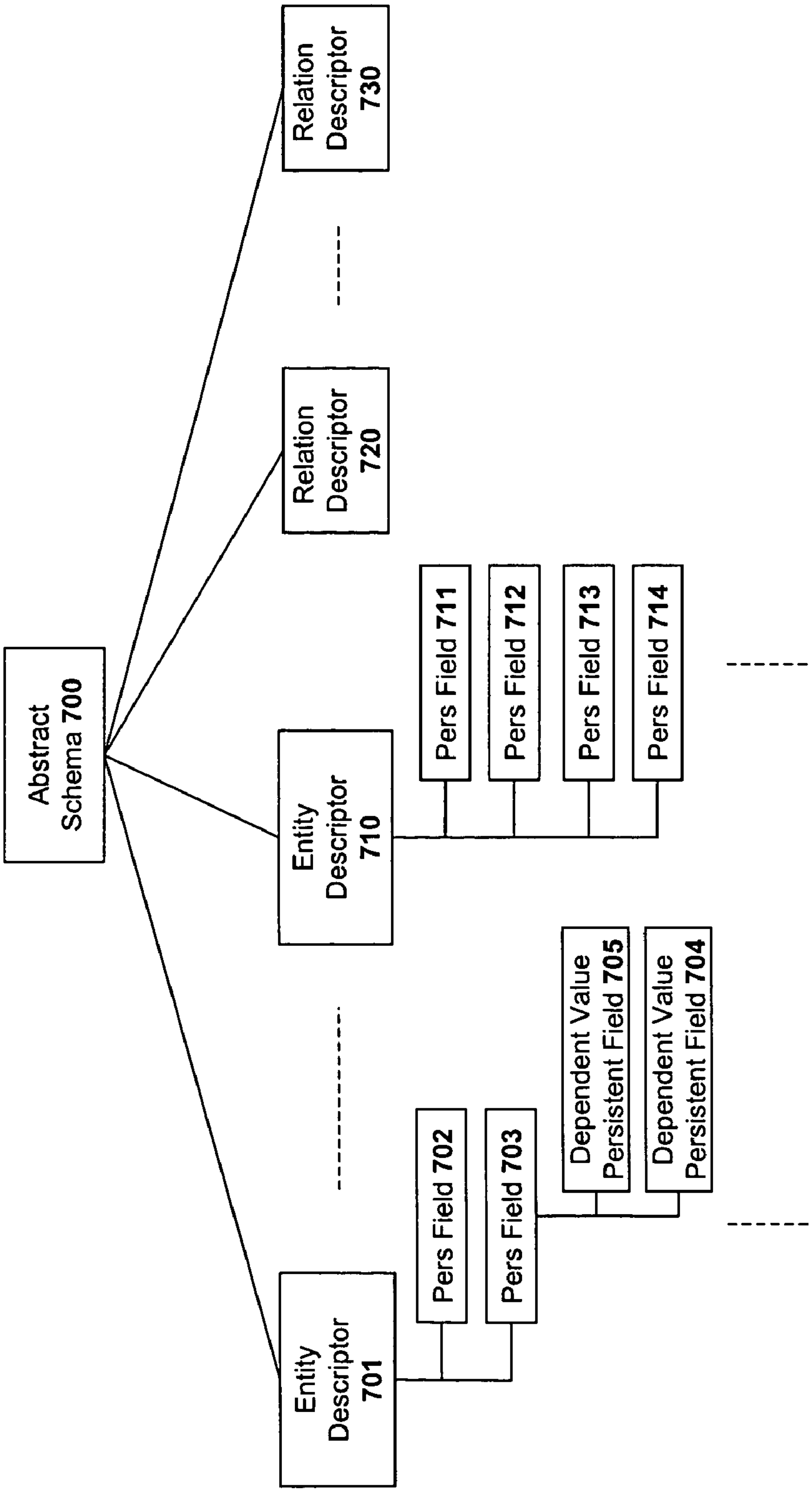
FIG. 7 illustrates an abstract schema tree generated during the object-relational mapping in one embodiment of the invention.

FIG. 7 illustrates an exemplary tree comprising an abstract schema object 700 at the root and a separate entity descriptor object 701, 710 representing each entity bean of the application. In addition, a persistent field object 702-703, 711-714 is created for each CMP field of each entity bean. For example, persistent field objects 702 and 703 represent persistent fields of the entity bean represented by entity descriptor object 701.

As illustrated, a dependent-value persistent field object 704, 705 (logically positioned under one or more persistent field objects 703) is created for each "dependent-value" persistent field of the entity bean. As is known by those of skill in the art, a dependent-value persistent field is a special kind of persistent field that extends features (fields) of the persistent field object. Dependent-value fields can be persisted as serialized objects within an entity bean and recovered at any time (e.g., using accessor and mutator methods). As described below, dependent-value persistent field objects are mapped to a database in a different manner than standard persistent fields.

Figure 1:
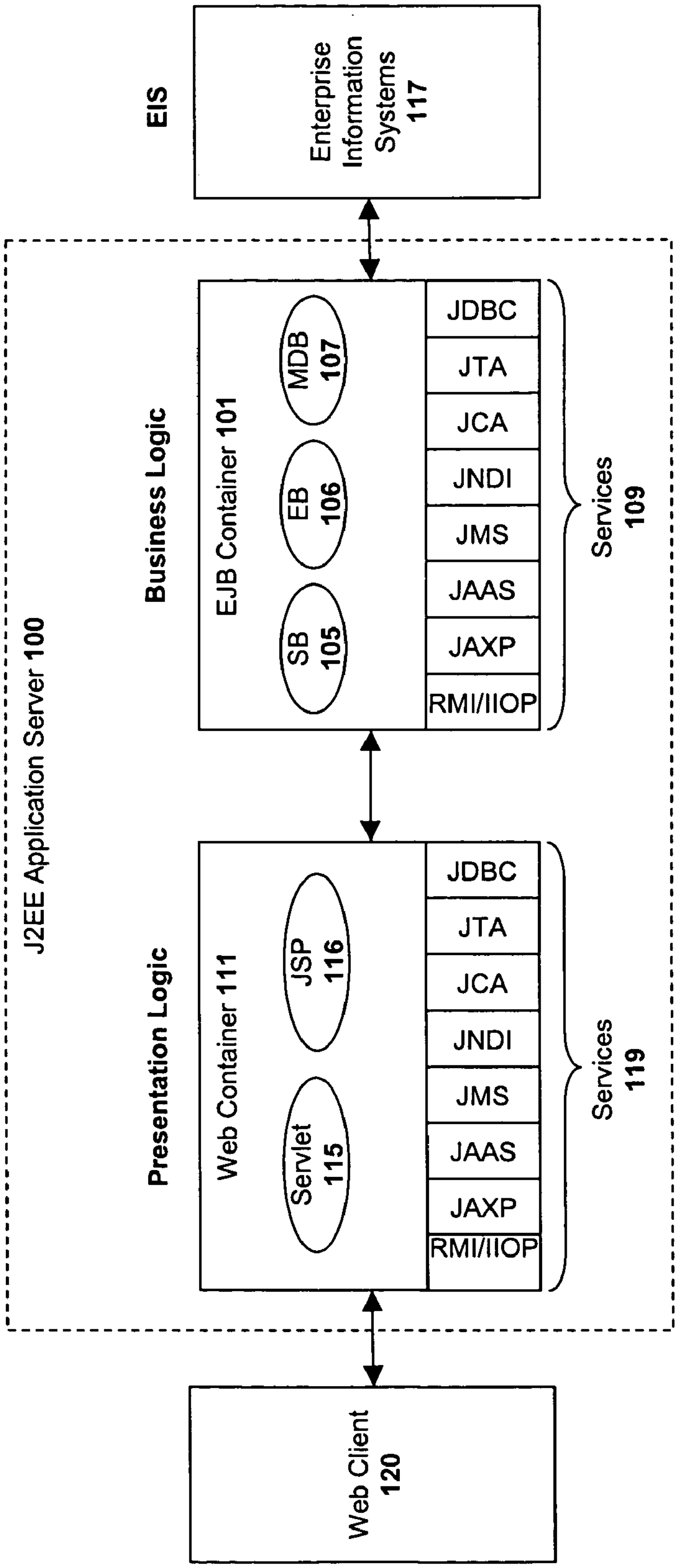
FIG. 1 illustrates several layers within a prior art J2EE architecture.
Figure 2:
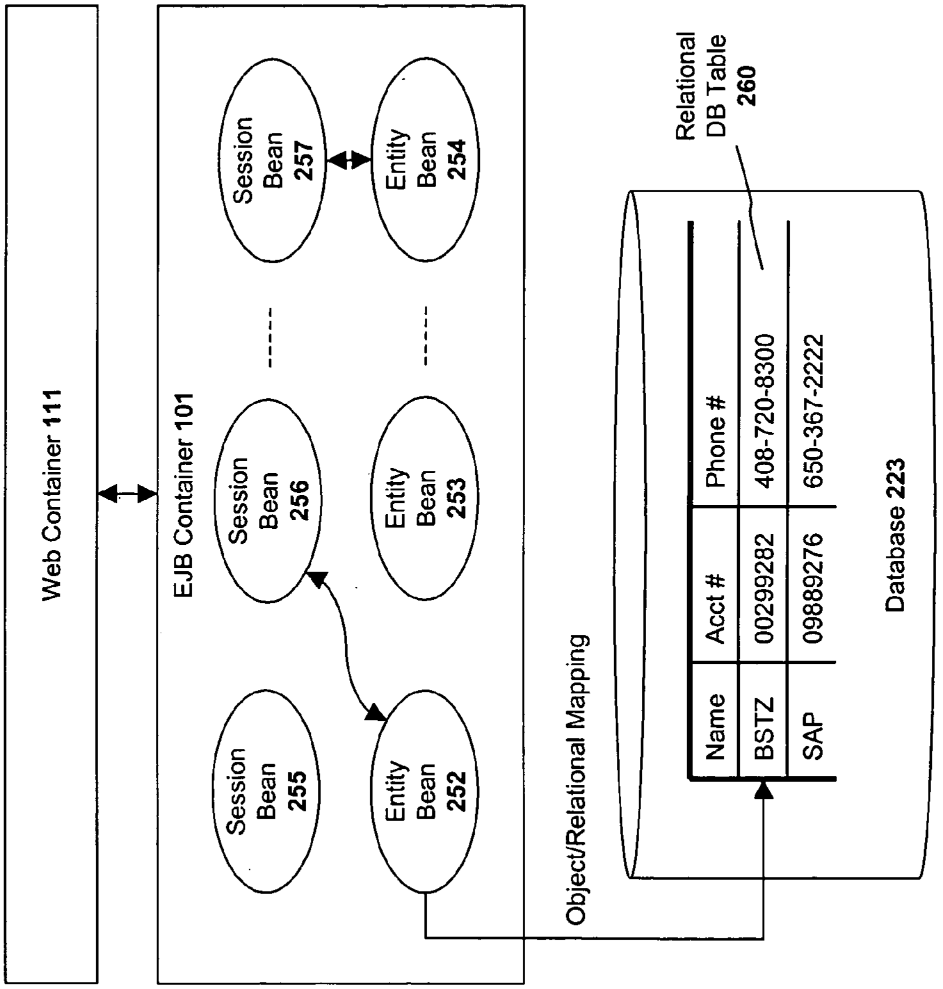
FIG. 2 illustrates a prior art object/relational mapping between an entity bean and a relational database table.
Figure 3:
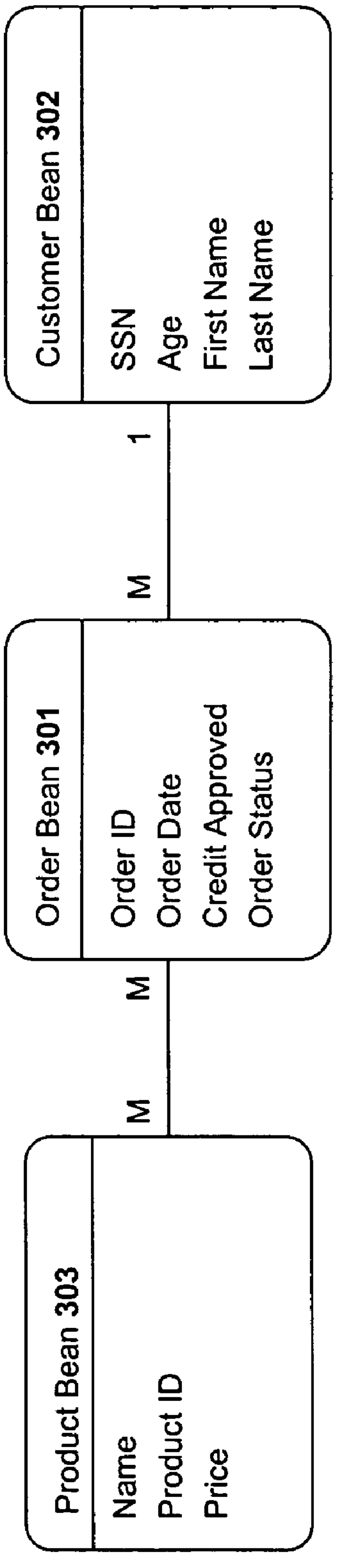
FIG. 3 illustrates an object model of three exemplary entity beans.

One or more relation descriptor objects 720, 730 are also generated within the tree to represent each container-managed relationship defined between entity beans. As described above, entity beans may be related to one another in one-to-one, one-to-many, and many-to-many relationships. For example, in FIG. 3, a many-to-many relationship is defined between the order bean 301 and the product bean 303. In addition, relationships may be bidirectional or unidirectional (as described below).

In one embodiment of the invention, the O/R mapping generation logic 502 generates an O/R mapping for each of the elements in the abstract schema, thereby associating each of the elements to an appropriate element in the database. For example, returning to the flowchart illustrated in FIG. 6, at 606, the O/R mapping generation logic 502 maps each entity descriptor object 701, 710 within the tree to a database table, thereby associating each entity bean with its own table. For example, if the entity descriptor 710 represents the "order" bean 301 from FIG. 3, then the O/R mapping generation logic 502 will map the entity descriptor object 710 to an ORDER table (named "OrderBean0" in FIG. 8) within the database. In one embodiment, the name of the table is generated concatenating the name of the persistent data object, followed by a unique index identifier of the bean. By way of example, for a persistent object <ejb-name>CustomerBean</ejb-name>, the following entry may be created: <table-name>CustomerBean1</table-name>.

In one embodiment of the invention, each persistent field of each persistent data object is mapped to a single column or a set of columns. Prior to mapping, each persistent field (also referred to as a "cmp-field") is classified as Type1, Type 2 or Type 3. Type 1 is a "settable" cmp-field (i.e., a cmp-field mapped to one column as described below); Type2 is a "non settable" cmp-field stored in one column (also mapped to one column); and Type3 is a "non settable" cmp-field stored in a set of columns. Type 3 includes type "dependent value class" and the "dependent value class" which should have an empty constructor and public modifier for all its persistent subfields.

A "settable" type is a java type that can be mapped to a proper JDBC type (i.e., proper set/get<Type> methods are provided for it in the JDBC API). A "settable" cmp-field is a field with "settable" type. Each "non settable" cmp-field may be mapped to one column in the database. Its value is serialized/desterilized before/after the database operations described herein. In one embodiment, a "non-settable" cmp-field may be mapped to a set of columns if the following requirements are fulfilled: (1) the cmp-field's class has an empty constructor; and (2) its "persistent subfield" is a field in the dependent value class that intends to be stored in a separate column in the database. The "persistent subfield" should be subset of public fields of the dependent value class and should have "settable" java type. As described below, the names of the "persistent fields" in the persistence descriptor are specified using the tag <dv-column>/<sub-field-name>. The term "dependent value persistent field" is equivalent to Type2 ("non settable" cmp-field) or Type3 ("non settable" cmp-field stored in a set of columns).

With these concepts in mind, at 608, the O/R mapping generation logic 502 maps each persistent field object 702-703, 711-714 of the tree, which is not a dependent-value persistent field object, to a single column within each database table. Returning to the previous example, if the entity descriptor 710 is mapped to an ORDER table, then persistent field objects 711, 712, 713 and 714 may be mapped to columns of the ORDER table which represent the persistent fields "Order ID," "Order Date," "Credit Approved," and "Order Status." The following table identifies the column types used in one embodiment of the invention for the default O/R mapping and the corresponding Java persistent field types:

| Java type | Default JDBC type |
|---|---|
| java.lang.String | VARCHAR |
| byte[ ] | VARBINARY |
| java.lang.Byte[ ] | VARBINARY |
| Short | SMALLINT |
| java.lang.Short | SMALLINT |
| Int | INTEGER |
| java.lang.Integer | INTEGER |
| Long | BIGINT |
| java.lang.Long | BIGINT |
| Float | REAL |
| java.lang.Float | REAL |
| Double | DOUBLE |

-continued

| Java type | Default JDBC type |
|---|---|
| java.lang.Double | DOUBLE |
| java.math.BigDecimal | DECIMAL |
| java.util.Date | TIMESTAMP |
| java.sql.Date | DATE |
| java.sql.Time | TIME |
| java.sql.Timestamp | TIMESTAMP |
| java.sql.Clob | CLOB |
| java.sql.Blob | BLOB |
| Boolean | SMALLINT |
| java.lang.Boolean | SMALLINT |
| Byte | SMALLINT |
| java.lang.Byte | SMALLINT |
| java.io.Reader | VARCHAR |
| java.io.InputStream | VARBINARY |

Returning to the flowchart illustrated in FIG. 6, at 610, if a persistent field is a dependent-value persistent field then, in one embodiment of the invention, it is mapped to a single column of type java.sql.Types.BLOB or to a set of columns. As is known in the art, BLOB is a type that stores a "Binary Large Object" as a column value in a row of a database table. By default, drivers implement BLOB using an SQL locator (BLOB), which means that a BLOB object contains a logical pointer to the SQL BLOB data rather than the data itself. Methods provided with the interfaces ResultSet, CallableStatement, and PreparedStatement (e.g., getBlob and setBlob) provide access to SQL BLOB values. The BLOB interface defined in the Java specification provides methods for retrieving the length of an SQL BLOB value, for materializing a BLOB value on a client, and for determining the position of a specific pattern of bytes within a BLOB value. In addition, the BLOB interface includes methods for updating a BLOB value.

In one embodiment, the O/R mapping generation logic 502 performs the dependent-value O/R mapping according to the following rules. If the dependent-value class has an empty constructor and all its fields are public, then the dependent-value persistent field is mapped to a set of columns. These columns are not stored in a separate database table; they are stored in the same database table as the other persistent fields of the bean. If at least one private field exists, or the constructor is not empty, then the dependent value class is mapped to a single column of type java.sql.Types.BLOB. The dependent-value object is serialized and is stored in the datebase as a byte[ ]. In this case the default mapping may not be permitted to be changed.

In one embodiment, column names for cmp-fields are selected according to the following rules. For persistent fields of Type1 ("settable" cmp-fields) or Type2 ("non settable" cmp-fields stored in one column), the name of the column is generated concatenating the name of the cmp-field, followed by UNDERSCORE, followed by index 0. By way of example, for the cmp-field <field-name>ssn</field-name>, the following entries are generated:

```
<column>
<column-name>ssn_0</column-name>
</column>
```

For cmp-fields of Type3 ("non settable" cmp-fields stored in a set of columns), the name of the column is generated concatenating the name of the persistent subfield, followed by UNDERSCORE, followed by an index. The index generation starts from 0 and increases with +1 for each of the next persistent subfield. For example, the following is an example of a "personal info" dependent value persistent field with subfields "age," "first name," and "second name":

```
<field-map
  key-type="NoKey">
  <field-name>personalInfo</field-name>
  <dv-column>
    <subfield-name>age</subfield-name>
    <column-name>age_0</column-name>
  </dv-column>
  <dv-column>
    <subfield-name>firstName</subfield-name>
    <column-name>firstName_1</column-name>
  </dv-column>
  <dv-column>
    <subfield-name>secondName</subfield-name>
    <column-name>second Name_2</column-name>
  </dv-column>
</field-map>
```

Referring again to FIG. 6, at 612, the O/R mapping generation logic 502 performs the O/R mapping of the relation descriptors 720, 730. In one embodiment, relations are realized using references between primary key column(s) and foreign key column(s), or "logical foreign key" column(s). A column is called "a logical foreign key" if it is a column that contains the values of the referenced table's primary key column, but is not declared as a foreign key. As used herein, a "foreign key" column may refer to both standard foreign keys and a logical foreign keys. In one embodiment, one or more different foreign key columns are defined for each relationship. For example, if there are N relationships between two entity beans, then there are N mappings between primary keys and foreign key columns.

As mentioned above, relations may be one-to-one, one-to-many, or many-to-many (defining the "cardinality" of the relation). In addition, relations may be unidirectional or bidirectional. A unidirectional relationship can be navigated in only one direction. For example, a "contact" entity bean (representing a contact within an address book) may include a relationship field that refers to an address bean but the address bean may not require a relationship field that refers to the contact bean. By contrast, a bidirectional relationship may be navigated in both directions. For example, an order bean may refer to a series of line items and each of the series of line items may refer back to the order (i.e., so that the order may be identified given a particular line item of that order).

In one embodiment of the invention, the O/R mapping generation logic 502 generates an O/R mapping of the relation descriptors according to the following rules. For one-to-one relationships, foreign key columns are provided in at least one of the two tables that participate in the relationship. For unidirectional one-to-one relations, a foreign key column is created in the table mapped to the entity bean which contains relationship field. For bidirectional one-to-one relations, foreign key columns are created in the tables mapped to each entity bean containing the relationship fields (e.g., identified in the first element of the <ejb-relationship-role>/<ejb-relationship-role> pair identified under the <ejb-relation> tag in the deployment descriptor).

In one embodiment of the invention, for one-to-many relations, foreign key columns are generated in the table of the bean whose multiplicity in this relationship is "many." In addition, in one embodiment, for many-to-many relationships, a mapping is provided which contains columns that are foreign key columns referencing the primary key columns of the two tables to which the beans participating in this relationship are mapped. The columns should have the same JDBC type as the primary key columns of the referenced tables. In one embodiment, this mapping is accomplished via a helper table within the O/R persistence description (described below).

In one embodiment, the following naming conventions are employed. The name of the foreign key columns is the name of the referenced primary key column, followed by UNDERSCORE, followed by a unique identifier of the relationship that is mapped with this foreign key column. For example, if a relationship with multiplicity 1:M exists between CustomerBean and OrderBean, the primary key column of the OrderBean is "orderId_0" and the unique relationship ID is 2:

```
<table-relation>
  <table-relationship-role
    key-type="PrimaryKey">
    <ejb-name>CustomerBean</ejb-name>
    <cmr-field>customers</cmr-field>
  </table-relationship-role>
  <table-relationship-role
    key-type="NoKey">
    <ejb-name>CustomerBean</ejb-name>
<fk-column>
  <column-name>
    orderId_0_2
  </column-name>
  <pk-field-name>
    orderId
  </pk-field-name>
</fk-column>
  </table-relationship-role>
</table-relation>
```

Thus, the unique relationship ID is used to generated different names of foreign key columns in situations when there are more then one relationship between two beans.

In one embodiment, many-to-many relationships between entity beans are represented within the O/R persistence description 510 using a "help table" in which the primary keys of one enterprise bean are associated with the primary keys of a second bean. In one embodiment, the help-table name is selected to be the ejb-name of the CMP bean in the relationship, followed by UNDERSCORE, followed by the ejb-name of the other CMP bean in the relationship, followed by UNDERSCORE, followed by relationship ID. In addition, the name of the foreign key columns in the help-table are the name of the referenced primary key column, followed by UNDERSCORE, followed by the bean ID, followed by UNDERSCORE, followed by a unique identifier of the relationship.

The following is an example of an "ProductBean_OrderBean_1" helper table for two beans, "ProductBean" and "OrderBean", that have related primary keys (i.e., Product with productId=1 is related to Order with orderId=2; Product with productId=4 is related to Order with orderId=8; Product with productId=1 is related to Order with orderId=1; Product with productId=11 is related to Order with orderId=10):

| productId_0_2_1 (Refer to Primary Key Column productId_0 of table ProdubtBean2) | orderId_0_0_1 (Refer to Primary Key Column orderId_0 of table OrderBean0) |
|---|---|
| 1 | 2 |
| 4 | 8 |
| 1 | 1 |
| 11 | 10 |

The foreign key column in the help-table that refers the OrderBean is "orderId_0_0_1" because the name of the primary key column of OrderBean is "orderId_0", the OrderBean ID is 0, and the relationship ID is 1. The foreign key column in the help-table that refers the ProductBean is "productId_0_2_1" because the name of the primary key column of ProductBean is "productId_0", the ProductBean ID is 2, and the relationship ID is 1. The following is an example of a help table described in XML:

```
<table-relation>
<help-table>ProductBean_OrderBean_1</help-table>
<table-relationship-role
  key-type="PrimaryKey">
  <ejb-name>OrderBean</ejb-name>
  <cmr-field>products</cmr-field>
  <fk-column>
    <column-name>orderId_0_0_1</column-name>
    <pk-field-name>orderId</pk-field-name>
  </fk-column>
</table-relationship-role>
<table-relationship-role
  key-type="PrimaryKey">
  <ejb-name>ProductBean</ejb-name>
  <fk-column>
    <column-name>productId_0_2_1</column-
      name>
    <pk-field-name>productId</pk-field-name>
  </fk-column>
</table-relationship-role>
</table-relation>
```

In case of M:M relationship the index of the referenced bean is added because if the two beans has the same primary key column name then the referenced foreign key columns will not differ.

Referring again to FIG. 6, at 614, the O/R persistence description 510 is stored so that it may be used to perform the O/R mapping during application deployment. FIGS. 8*a-c* illustrates an exemplary O/R persistence description 510 created via the method of FIG. 6. For the purpose of illustration, the O/R persistence description has been selected to correspond to the deployment descriptor illustrated in FIG. 3. Specifically, entity bean sections 801, 802 and 803 correspond to the order bean 301, customer bean 302 and product bean 303 illustrated in FIG. 3.

Each entity bean section 801, 802, 803 includes a mapping of the entity bean it represents to a database table, and a mapping of the persistent fields of the entity bean to the columns of the database table. For example, entity bean section 801 includes an association between the entity bean name ("OrderBean") 810 and a table name ("OrderBean0") 811. In one embodiment, the name of the database table is automatically generated based on the name of the entity bean which represents it (e.g., using the same name or a derivation of the entity bean name). It should be noted, however, that automatic generation of table names is not required for complying with the underlying principles of the invention. For example, the O/R mapping generation logic 502 may map existing database tables to entity beans, rather than generating a new name for each table.

In addition, in one embodiment, the O/R persistence description 510 includes a plurality of field mapping sections 812-815 that map each persistent field of the entity bean to a column in the associated database table. For example, in FIG. 8*a*, field mapping section 812 maps the "orderID" field to an "orderId_0" column within the "OrderBean0" table. Similarly, field mapping section 813 maps the "orderDate" field to an "orderDate_0" column;

field mapping section 814 maps the "creditApproved" field to a "creditApproved_0" column; and field mapping section 815 maps the "orderStatus" field to an "orderStatus_0" column. Similar mapping entries are illustrated in FIGS. 8a-b for the product bean and customer bean.

FIG. 8c illustrates a portion of the O/R persistence description 510 that maps the relationships between entity beans to database tables. For example, to describe the one-to-many relationship between the customer bean 302 and the order bean 301, table-relation section 805 maps the "customers" relationship descriptor of the order bean to a foreign key column orderId_0_0 of the CustomerBean table mapped to the primary key column orderId of the OrderBean table.

Table-relation section 806 provides the relationship mapping between the order bean 301 and the product bean 303. For example, "table-relationship-role" section 822 maps a foreign key column orderId_0_0_1 in the help-table ProductBean_OrderBean_1 table to the primary key column of the OrderBean0 table; and "table-relationship-role" section 823 maps a foreign key column productId_0_2_1 in the help-table ProductBean_OrderBean_1 to the primary key column of the ProductBean2 table.

As mentioned above (and as illustrated in FIG. 5a), one embodiment of the invention includes database schema generation logic 503 for automatically generating a default database schema definition 514 matching the persistence description provided by the O/R persistence descriptor 510. This step is represented at block 616 in the process of FIG. 6.

In one embodiment, the database schema generation logic 503 parses the deployment descriptor 501 (ejb-jar.xml) then O/R persistence description 510 (persistent.xml) and generates a series of SQL commands to create the database schema. For example, for each table and associated columns defined within the O/R persistence description 510, the database schema generation logic 503 may execute SQL commands according to the following format:

```
CREATE TABLE table_name (
column1_name   data_type   [(length)]   [NULL|NOT
  NULL],
column2_name   data_type   [(length)]   [NULL|NOT
  NULL],
column3_name   data_type   [(length)]   [NULL|NOT
  NULL],
  primary key definition,
  foreign keys definition
. . . )
```

Specifically, using the example illustrated in FIGS. 8a-c, the database schema generation logic 503 might generate the CustomerBean0 table with the following. The table illustrated in FIG. 10 contains data types for different database systems. Values from this table are used when create table statements are generated.

```
CREATE TABLE OrderBean0 (
  orderId_0 INTEGER NOT NULL<
  primary key (prderId_0),
  orderDate_0 DATE,
  creditApproved_0 INTEGER,
  orderStatus_0 INTEGER
)
CREATE TABLE CustomerBean0 (
  ssn_0            INTEGER          NOT NULL,
  primary key (ssn_0),
  age_0            INTEGER          NULL,
```

-continued

```
  firstName_0      VARCHAR(128)     NOT NULL,
  lastName_0       VARCHAR(128)     NOT NULL,
  orderId_0_0      INTEGER
)
CREATE TABLE ProductBean2 (
  productId_0     INTEGER     NOT NULL,
  primary key (productId_0),
  name_0           VARCHAR(128),
  price_0          REAL NOT NULL
)
CREATE TABLE ProductBean_CustomerBean_1 (
  orderId_0_0_1 INTEGER
  productId_0_2_1 INTEGER
)
```

In the foregoing example, any field which should be required is designated as NOT NULL (e.g., such as the customer's SSN which is the primary key of the table). Similar commands may be executed by the database schema generation logic 503 to automatically generate the OrderBean table and the ProductBean table.

The database schema generation logic 503 may generate additional columns as required for the primary key/foreign key relation mappings provided in the O/R persistence description. In addition, in one embodiment, during the O/R mapping process, when column and table names are generated as described above, the default OR mapping generation logic 502 makes additional checks to determine whether the length of each generated name exceeds the maximum allowed length in the underlying database system.

Figure 5B:
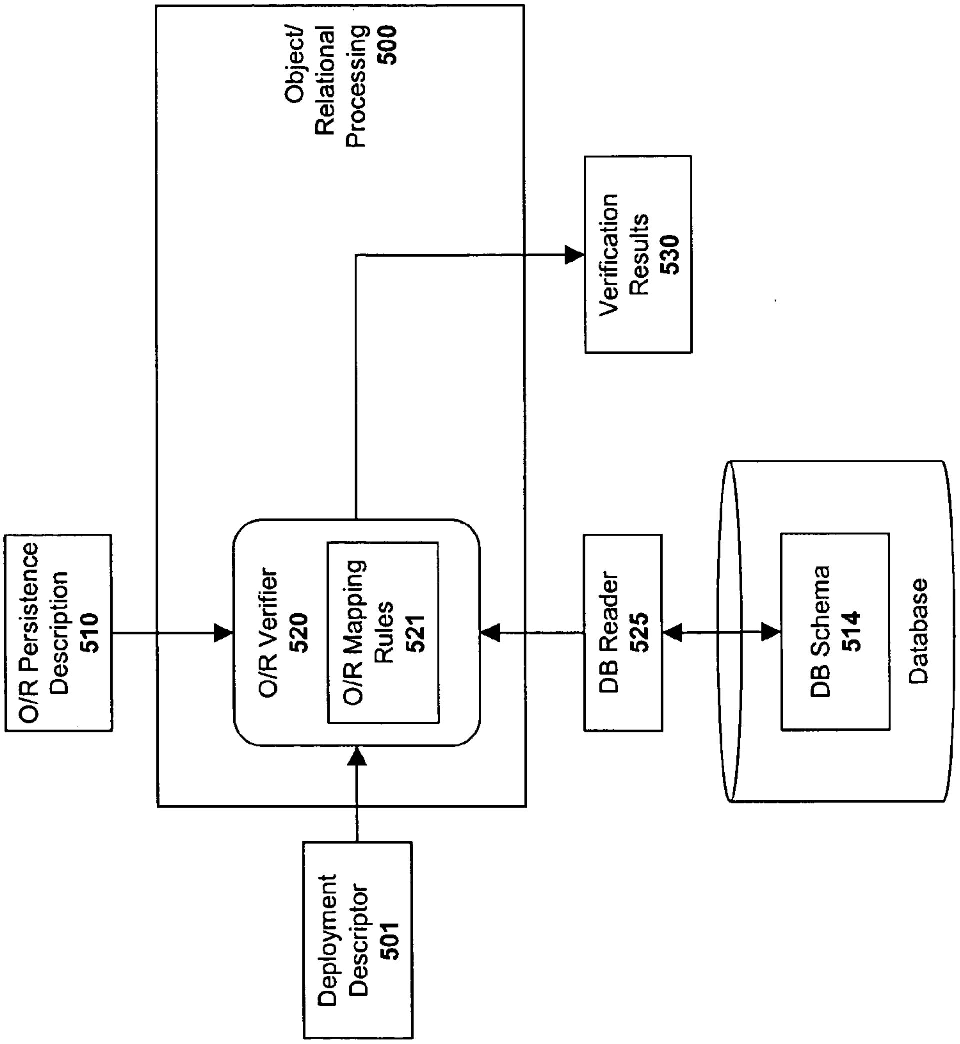
FIG. 5*b* illustrates one embodiment of a system for verifying that an object-relational mapping and deployment descriptor complies with a set of object-relational mapping rules.

System and Method for Verifying an Object-Relational Mapping Between Object-Oriented Program Code and a Database Layer Referring now to FIG. 5b, one embodiment of the invention includes an object-relational verification module 520 to verify the legitimacy of a particular O/R mapping described in an existing O/R persistence descriptor 510. In one embodiment, the object-relational verification module 520 evaluates the existing database schema 514 (e.g., via a database reader module 525 such as a catalog reader) to determine whether the database schema 514 fits the abstract schema defined in the O/R persistence descriptor 510 and whether the mapping fulfills a predefined set of O/R mapping rules 521.

Figure 9:
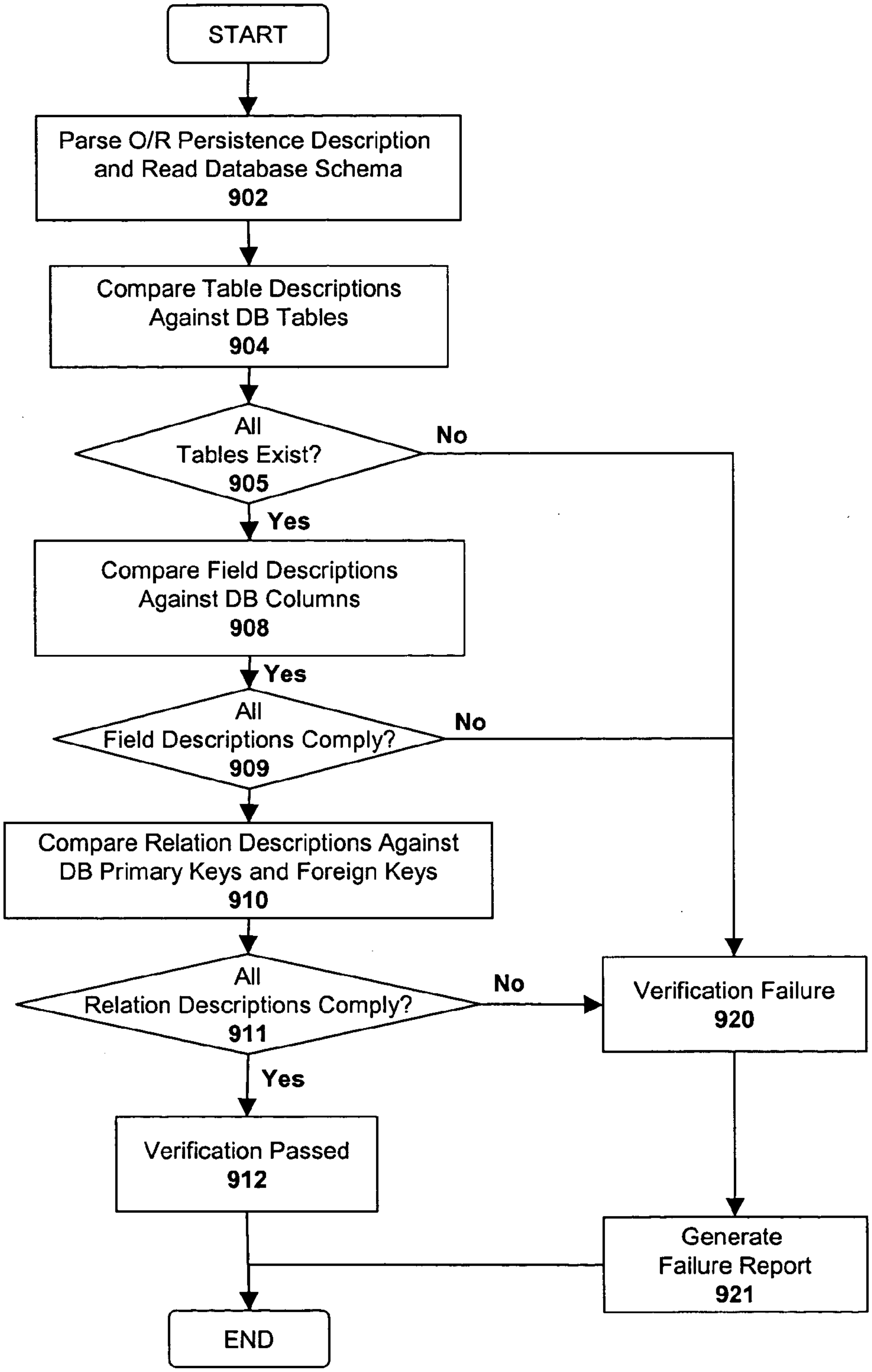
FIG. 9 illustrates one embodiment of a system for verifying that an object-relational mapping complies with a set of object-relational mapping rules.

In one embodiment, the object-relational verification module 520 operates according to the method set forth in FIG. 9. At 902 the object-relational verification module 520 parses the O/R persistence descriptor 510 to determine the existing O/R mapping between entity beans of the application and the database schema. At 904, the object-relational verification module 520 determines whether each enterprise bean described in the O/R persistence descriptor 510 is stored in a separate database table. If not, determined at 905, then a verification failure is generated at 920 and the specific details of the failure (e.g., table does not exist) are added to a failure report at 921.

If a separate table exists within the database schema for each entity bean entry, then at 908, the object-relational verification module 520 compares the field descriptions of each entity bean against the table columns defined within the database schema 514. For example, the object-relational verification module 520 ensures that each persistent field which is not dependent-value is mapped to a single column within the correct database table. In addition, the object-relational verification module 520 determines whether an acceptable JDBC type has been assigned for each column, based on the Java type of the corresponding persistent field. In one embodiment, the object-relational verification module 520 evaluates the validity of the assigned JDBC types based on the following table, which lists acceptable and default JDBC types for each Java type:

| Java Type | Acceptable JDBC Types | Default JDBC Type |
|---|---|---|
| java.lang.String | VARCHAR, CHAR[4], LONGVARCHAR[3], CLOB[3] | VARCHAR |
| byte[ ] | VARBINARY, BINARY[4], LONGVARBINARY[3], BLOB[3] | VARBINARY |
| java.lang.Byte[ ] | VARBINARY, BINARY[4], LONGVARBINARY[3], BLOB[3] | VARBINARY |
| Short | SMALLINT | SMALLINT |
| java.lang.Short | SMALLINT | SMALLINT |
| Int | INTEGER | INTEGER |
| java.lang.Integer | INTEGER | INTEGER |
| Long | BIGINT | BIGINT |
| java.lang.Long | BIGINT | BIGINT |
| Float | REAL | REAL |
| java.lang.Float | REAL | REAL |
| Double | DOUBLE, FLOAT[4] | DOUBLE |
| java.lang.Double | DOUBLE, FLOAT[4] | DOUBLE |
| java.math.BigDecimal | DECIMAL, NUMERIC[4] | DECIMAL |
| java.util.Date | TIMESTAMP | TIMESTAMP |
| java.sql.Date | DATE | DATE |
| java.sql.Time | TIME | TIME |
| java.sql.Timestamp | TIMESTAMP | TIMESTAMP |
| java.sql.Clob | CLOB[3] | CLOB[3] |
| java.sql.Blob | BLOB[3] | BLOB[3] |
| boolean | SMALLINT[1] | SMALLINT[1] |
| java.lang.Boolean | SMALLINT[1] | SMALLINT[1] |
| Byte | SMALLINT[2] | SMALLINT[2] |
| java.lang.Byte | SMALLINT[2] | SMALLINT[2] |
| java.io.Reader | VARCHAR[2] | VARCHAR[2] |
| java.jo.InputStream | VARBINARY[2] | VARBINARY[2] |

The following notes correspond to the numerical designations in the above table:

[1]The Common JDBC default mapping is BIT; however, boolean/java.lang.Boolean is not fully supported by Common JDBC. SMALLINT is the preferred mapping for the EJB Container.

[2]No Common JDBC default mapping exists; type/class in not fully supported by Common JDBC.

[3]LOGVARBINARY, LONGVARCHAR, BLOB, and CLOB are not permitted in WHERE-clauses, ORDER BY-clauses, and SELECT DISTINCT statements.

[4]Not fully supported JDBC type.

The following additional O/R mapping rules are employed by the object-relational verification module 520 in one embodiment of the invention:

1. If a persistent field represents a date type and will be involved in a QL query, its Java type must be java.util.Date.

2. A persistent field, which is dependent-value, can be mapped to a single column of type java.sql.Types. BLOB or a set of columns. As mentioned above, if mapped to a single column, the value of the persistent field is serialized to a byte array by using the standard Java serialization mechanism. In one embodiment, the dependent-value persistent field may be mapped to a set of columns only if the dependent-value class has an empty constructor and all its fields, which are described in the <dv-column> element, are public. Each public field of the dependent-value class that is described in the <dv-column> element in the O/R persistence description 510 is mapped to one of the columns in the set. The columns in the set are part of the entity bean's table, as are the other persistent fields of the bean. In one embodiment, the O/R verification module 520 ensures that these columns are not defined in a separate table and that only the fields described in the <dv-column> element will be stored in the database. In one embodiment, the acceptable types for these fields include a standard Java type (it is stored in its corresponding column). The type of the column must be one of the acceptable JDBC types for that Java type. Another acceptable type is a serializable Java type—i.e., the field is serialized and stored in its corresponding column in the set. The JDBC type of this column must be java.sql.Types. BLOB.

3. A column is defined as primary key only if the column is part of the O/R mapping of a primary key persistent field.

4. If an enterprise bean has an unknown primary key, then a default primary key persistent field must be used. In one embodiment, its name is "ejb_pk." Therefore, other non-primary key persistent fields may not have the same name. The O/R mapping of this additional persistent field must be described in the O/R persistence descriptor 510 (persistent.xml) only, not in the deployment descriptor (ejb-jar.xml). If the O/R persistence descriptor 510 is automatically generated (e.g., as described above), then one embodiment of the system will automatically create the O/R mapping, but if the O/R persistence descriptor 510 is written manually then it must be explicitly specified. The JDBC type of the corresponding column must be java.sql.Types.BIGINT and this column must be the only primary key column in the database table.

If one or more of the field descriptions do not comply with the foregoing set of O/R mapping rules 521, determined at 909, then at 920 a verification failure is generated and at 921 the reasons for the failure are added to the failure report. If, however, all of the field descriptions comply with the O/R mapping rules 521, then at 910 the relation descriptions provided in the O/R persistence description 510 are evaluated based on the following O/R mapping rules which pertain to relationship fields.

Relationships are to be realized using references between primary key column(s) and foreign key column(s), or logical foreign key column(s). As mentioned above, a column is called "a logical foreign key" if it is a column that contains the values of the referenced table's primary key column, but is not declared as a foreign key. One or more different foreign key columns are to be defined for each relationship. If there are N relationships between two entity beans, then there must be N mappings between primary keys and foreign key columns. The JDBC type of a foreign key column must be the same as the JDBC type of the referenced primary key column. A unique key column cannot be used as part of a foreign key. This means that a foreign key column may not be defined as a unique or primary key column.

For one-to-one relationships, the foreign key columns are columns in one of the two tables that participate in this relationship. For one-to-many relationships, the foreign key columns are columns in the table of the bean whose multiplicity in this relationship is Many. Finally, for many-to-many relationships, the O/R verification module 520 determines whether a helper table exists which contains columns that are foreign key columns referencing the primary key columns of the two tables to which the beans participating in the relationship are mapped. The columns should have the same JDBC type as the primary key columns of the referenced tables.

If one or more of the relation descriptions do not comply with the foregoing set of O/R mapping rules 521, determined at 911, then at 920 a verification failure is generated and at

921 the reasons for the failure are added to the failure report. If all of the relation descriptions within the O/R persistence description 510 comply with the O/R mapping rules 521, then at 912, the O/R verification module 520 allows the application to pass verification. The application may then be deployed.

It should be noted that the methods set forth above do not need to be executed in the specific order illustrated to comply with the underlying principles of the invention. For example, in FIG. 6, elements of the database schema may be generated concurrently with each step in the mapping process, rather than at the end of the process. For example, a new database table may be generated as each entity descriptor is mapped at 606 (rather than waiting for the O/R persistence description to be stored at 614). Similarly, in FIG. 9, the table descriptions and field descriptions may be evaluated concurrently, rather than separately. Various additional/intermediate steps may also be employed while still complying with the underlying principles of the invention.

The following is the document type definition ("DTD") that describes how mapping information is specified within the O/R mapping descriptor 510. The DTD describes a J2EE implementation in which persistent fields (cmp-fields) are referred to database columns and relationship fields (cmr-fields) are referred to PK-FK pair. It should be noted, however, that many of the specific formats employed within the DTD are not required for complying with the underlying principles of the invention.

PERSISTENT.DTD

<!--

The root element of this deployment descriptor. It contains information about specific database properties along with information concerning the entity beans and the different relationships among them.

-->

<!ELEMENT persistent-ejb-map (switch-off-verification?, create-tables-at-deploy?, locking?, db-properties?, entity-beans?, relationships?)>

<!--

If specified, during deployment it disables the verification whether the O/R mapping is correct.

-->

<!ELEMENT switch-off-verification EMPTY>

<!--

If this element exists and the database tables are not created, during deployment the system will create the tables exactly as described in persistent.xml. If the database tables are already created, the system will not create new tables or modify the existing ones. If the O/R mapping is not specified correctly in persistent.xml, the database tables will not be created correctly, too. We therefore recommend that you switch on O/R mapping verification, that is, omit the switch-off-verification element in persistent.xml.

-->

<!ELEMENT create-tables-at-deploy EMPTY>

<!--

This element is used to control concurrent access from different transactions to the entity beans. The Table locking automatically locks the entity beans in the Enqueue Server and in this way ensures that all applications that run in the cluster and use common data have common locks. The Administrative locking is deprecated and should not be used for applications. Local locking can only be used when there is only one server running, because it does not synchronize the locks on multiple servers that work in a cluster. That is, the Local locking synchronizes the concurrent access on one server only, and does not use the Enqueue Server to keep the locks. In this case, the application can use the EJBLocking API to make an explicit locking in the Enqueue Server.

-->

<!ELEMENT locking EMPTY>

<!--

Specifies the type of locking.

-->

<!ATTLIST locking type (Administrative|Table|Local) "Table">

<!--

Describes the properties of the database used. These properties are valid for the database mappings of the entire abstract schema.

Note: This element is mandatory for persistent.xml, no matter whether it is specified as optional in the root element DTD.

Example

<db-properties>

<data-source-name>myDataSource</data-source-name>

<database-vendor>SAPDB</database-vendor>

</db-properties>

-->

<!ELEMENT db-properties (data-source-name, database-vendor?)>

<!--

The name of the data source used to establish a connection to the database.

-->

<!ELEMENT data-source-name (#PCDATA)>

<!--

The name of the database used. If this element is omitted, the system marks the database as unknown.

-->

<!ELEMENT database-vendor EMPTY>

<!--

The possible values of the database used.

-->

<!ATTLIST database-vendor name (DB2_UDB|DB2_UDB_AS400|DB2_UDB_OS3901MS_ SQL_SERVER|ORACLE|S APDB) #REQUIRED>

!--

Contains a list of all container-managed entity beans to which the abstract schema applies, the entity bean properties, and database mappings.

Note: This element is mandatory for persistent.xml, no matter whether it is specified as optional in the root element DTD.

-->

<!ELEMENT entity-beans (entity-bean+)>

<!--

Example

```
<entity-bean>
<ejb-name>myEntityBean</ejb-name>
<table-name>myTable</table-name>
<field-map key-type="PrimaryKey">
  <field-name>id</field-name>
  <column>
    <column-name>id__0</column-name>
  </column>
</field-map>
<field-map>
  <field-name>name</field-name>
  <column>
    <column-name>name__0</column-name>
  </column>
</field-map>
<field-map>
  <field-name>order</field-name>
  <column>
    <column-name>order__0</column-name>
  </column>
</field-map>
<field-map>
  <field-name>item</field-name>
  <column>
    <column-name>item__0</column-name>
  </column>
</field-map>
<finder-descriptor>
  <criteria>select name__0,order__0 from myTable where
    item__0=?1</criteria>
  <method-name>findByOrder</method-name>
  <method-params>
    <method-param>java.lang.String</method-param>
  </method-params>
  <switch-off-storing/>
</finder-descriptor>
<finder-descriptor>
  <criteria>select name__0,order__0 from myTable where
    order__0=?1 AND order__0=?2</criteria>
  <method-name>findByOrderAndItem</method-
    name>
  <method-params>
    <method-param>int</method-param>
    <method-param>java.lang.String</method-param>
  </method-params>
  <switch-off-storing/>
</finder-descriptor>
<finder-descriptor>
  <method-name>ejbSelectAggFunction</method-
    name>
  <method-params/>
  <ql-2.1-compatible/>
</finder-descriptor>
</entity-bean>
```

-->

<!ELEMENT entity-bean (ejb-name, table-name, (read-only|select-for-update)?, field-map*, finder-descriptor*)>

<!--

The name of the enterprise bean, as defined in ejb-jar.xml.

-->

<!ELEMENT ejb-name (#PCDATA)>

<!--

The name of the database table in which the entity bean persistent data is stored. Each EJB from the abstract schema is stored in a separate table.

-->

<!ELEMENT table-name (#PCDATA)>

<!--

This element exists only when the entity bean is not allowed to update the data in the database. The bean is allowed only to read data from the database.

-->

<!ELEMENT read-only EMPTY>

<!--

Specifies that the entity bean will use database locking.

-->

<!ELEMENT select-for-update EMPTY>

<!--

Describes the database mappings between cmp-fields and columns in the database.

If the cmp-field is a dependent-value field and if it contains an empty constructor, then the database mapping of its fields that are declared public can be declared in the dv-column element, and the cmp-field is mapped to multiple columns. However, this is not obligatory.

Both dependent-value and non-dependent-value cmp-field mappings can be described in the column element. In this case, the dependent-value cmp-field, is serialized and stored in a java.sql.Types.BLOB column.

-->

<!ELEMENT field-map (field-name, (column|dv-column+))>

<!--

Specifies the type of the column or the set of columns, in which the values of the cmp-field are stored. The default value is NoKey.

-->

<!ATTLIST field-map key-type (NoKey|PrimaryKey|UniqueKey) "NoKey">

<!--

This element exists only if the cmp-field is mapped to a single column in the database table.

-->

<!ELEMENT column (column-name)>

<!--

Describes the database mapping of a cmp-field to a set of columns.

-->

<!ELEMENT dv-column (subfield-name, column-name)>

<!--

The name of the field in the dependent-value class that is described.

-->

<!ELEMENT subfield-name (#PCDATA)>

<!--

The name of the column in the database table to which this field is mapped.

-->

<!ELEMENT column-name (#PCDATA)>

The name of the cmp-field whose mapping is described.

-->

<!ELEMENT field-name (#PCDATA)>

<!--

If the beans are developed according to the Enterprise JavaBeans™ v.1.1 Specification, this element describes the SQL select statements for the bean's finder methods. If the beans are developed according to the Enterprise Java-Beans™ v.2.0 Specification, this element describes the bean's SQL finder methods, which differ from the default finder statements that are generated by the QL parser. This element also specifies whether data storing for the finder and select methods is switched on or off, which of the bean's fields will be retrieved from the database, and whether the QL is 2.1 compatible.

-->

<!ELEMENT finder-descriptor (criteria?, method-name, method-params, switch-off-storing?, load-selected-objects?, ql-2.1-compatible?)>

<!--

Defines the select statement that is going to be executed in this finder method. Use format ?i to specify the number of the parameter, which should be used instead of the statement. Parameters are numbered from 1 to N.

Example

<criteria>select name__0,order__0 from myTable where order__0=?1 AND order__0=?2</criteria>

If this criteria describes EJB2.0, it is not recommended that you overwrite the default statement that was generated by the QL parser. It is forbidden to change the default SQL statements of QL queries of select methods. If this element is specified for select methods, it will be ignored. The system will not detect whether the criteria is not correct, or whether it returns the wrong result type during the application's deployment. However, the system will throw an exception at runtime when you try to execute the incorrect criteria.

-->

<!ELEMENT criteria (#PCDATA)>

<!--

The name of the finder/select method.

-->

<!ELEMENT method-name (#PCDATA)>

<!--

The parameters of the finder/select method.

-->

<!ELEMENT method-params (method-param*)>

<!ELEMENT method-param (#PCDATA)>

<!--

Switches off data storing before this finder/select method is executed.

-->

<!ELEMENT switch-off-storing EMPTY>

<!--

If this element exists the bean is locked and when the finder/select method is executed, all fields of the bean are loaded from the database. Otherwise, if the element is omitted, only the primary key fields are retrieved from the database. The locking ensures that until the end of the transaction the loaded data will remain consistent with the last state of the data in the database and avoids reloading of the same data when the transaction uses it later again.

-->

<!ELEMENT load-selected-objects EMPTY>

<!--

Specifies the kind of lock that must be set on the bean—read or write.

-->

<!ATTLIST load-selected-objects lock (read|write) #IMPLIED>

<!--

By default, each query is QL 2.0 compatible. If you need to use ORDER BY, aggregate functions, and so on, use this element to indicate that the QL is 2.1 compatible. If this element exists, the query is considered QL 2.1 compatible. This element is taken into account only if the specified method is an EJB 2.0 finder or select method.

-->

<!ELEMENT ql-2.1-compatible EMPTY>

<!--

Describes the relations in the database table.

Example

```
<relationships>
<table-relation>
  <help-table>myHelpTable</help-table>
  <table-relationship-role key-type="PrimaryKey">
    <ejb-name>myReferencingBean</ejb-name>
    <cmr-field>myCmrField</cmr-field>
    <fk-column>myFKColumn</fk-column>
  </table-relationship-role>
  <table-relationship-role key-type="PrimaryKey">
```

```
        <ejb-name>myReferencedBean</ejb-name>
        <cmr-field>myOtherCmrField</cmr-field>
        <fk-column>myOtherFKColumn</fk-column>
     </table-relationship-role>
  </table-relation>
  <table-relation>
  <help-table>AEJB_BEJB__2</help-table>
  <table-relationship-role key-type="PrimaryKey">
     <ejb-name>AEJB</ejb-name>
     <cmr-field>b</cmr-field>
     <fk-column>
        <column-name>id__0__0__2</column-name>
        <pk-field-name>id</pk-field-name>
     </fk-column>
  </table-relationship-role>
  <table-relationship-role key-type="PrimaryKey">
     <ejb-name>BEJB</ejb-name>
     <cmr-field>a</cmr-field>
     <fk-column>
        <column-name>id__0__1__2</column-name>
        <pk-field-name>id</pk-field-name>
     </fk-column>
  </table-relationship-role>
  </table-relation>
  <table-relation>
  <table-relationship-role key-type="NoKey">
     <ejb-name>BeanEJB</ejb-name>
     <cmr-field>a1</cmr-field>
     <fk-column>
        <column-name>id___0__0</column-name>
        <pk-field-name>id</pk-field-name>
     </fk-column>
  </table-relationship-role>
  <table-relationship-role key-type="PrimaryKey">
     <ejb-name>AEJB</ejb-name>
  </table-relationship-role>
  </table-relation>
</relationships>
-->
<!ELEMENT relationships (table-relation*)>

<!ELEMENT table-relation (help-table?, table-relationship-role, table-relationship-role)>

<!--
In case of an M:M relation, it is obligatory that you use a help table; this element exists when an M:M relation is described. The value of this element is the name of the help table.
-->
<!ELEMENT help-table (#PCDATA)>

<!--
Describes the relations in the bean's database table.
-->
<!ELEMENT table-relationship-role (ejb-name, cmr-field?, fk-column*)>

<!--
The type of the column(s) that participate in the relationship. The default value is PrimaryKey.
-->
<!ATTLIST table-relationship-role key-type (NoKey|PrimaryKey|ForeignKey) "PrimaryKey">

<!--
If the value of the key-type element is NoKey or ForeignKey, this element is used to describe a foreign (logical) key column and its reference to the corresponding primary key cmp-field. In such cases, the <fk-column>elements are mandatory. If the key-type is PrimaryKey, the <fk-column>element should exist only if the relationship has multiplicity many-to-many. The <fk-column>element describes the referenced columns in the help table.
-->
<!ELEMENT fk-column (column-name, pk-field-name)>

<!--
The name of the foreign key column.
-->
<!ELEMENT column-name (#PCDATA)>

<!--
The name of the referenced primary key cmp-field as specified in ejb-jar.xml.
-->
<!ELEMENT pk-field-name (#PCDATA)>

<!--
The name of the cmr-field as described in ejb-jar.xml. This element does not exist if a unidirectional relationship is described and the table-relationship-role element describes this part of the relation, which has no cmr-field.
-->
<!ELEMENT cmr-field (#PCDATA)>
```

Embodiments of the invention may include various steps as set forth above. The steps may be embodied in machine-executable instructions which cause a general-purpose or special-purpose machine, such as a computer processor or virtual machine, to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on the Java environment, the underlying principles of the invention may be employed in virtually any environment in which relational database data is mapped to an object-oriented representation of the relational database data. These environments include, but are not limited to J2EE, the Microsoft.NET framework, and the Advanced Business Application Programming ("ABAP") standard developed by SAP AG.

Accordingly, the scope and spirit of the invention should be judged in terms of the claims which follow.

What is claimed is:

1. A method implemented on a computing system having at least one processor comprising:

providing a representation of an object-oriented set of data;

analyzing specified characteristics of each object represented in the object-oriented representation;

based on the analysis, generating a default object-relational ("O/R") mapping that maps each object of the object-oriented representation to a relational database according to a set of default O/R mapping rules;

storing the O/R mapping on a storage medium;

wherein analyzing comprises identifying entity beans within the representation of the object-oriented set of data and wherein mapping comprises mapping each entity bean to a unique table in the relational database and further comprises identifying persistent fields for each entity bean within the representation of the object-oriented set of data and wherein mapping comprises mapping each persistent field to a column of the table mapped to the entity bean;

wherein the default O/R mapping rules specify that certain types of persistent fields are to be mapped only to certain types of database data types, wherein mapping comprises mapping each persistent field of a particular type to a column having a data type corresponding to the persistent field type;

wherein the default O/R mapping rules specify that one type of persistent field is a dependent-value persistent field and wherein the O/R mapping rules specify different types of O/R mappings for different dependent-value persistent fields;

mapping a first dependent-value persistent field to a single column of type java.sgl.Types.BLOB; and mapping a second dependent-value persistent field to a set of columns;

wherein, as specified by the default O/R mapping rules, the second dependent-value persistent field is mapped to a set of columns only when the second dependent-value persistent field's dependent-value class has an empty constructor and all of the second dependent-value persistent field's fields are public.

2. The method as in claim 1 wherein the persistent field type comprises java.lang.string and wherein the database data type comprises VARCHAR.

3. The method as in claim 1 wherein analyzing comprises identifying relationships between entity beans within the representation of the object-oriented set of data and wherein mapping comprises generating references between primary key columns and foreign key columns of related entity beans.

4. The method as in claim 3 further comprising generating N mappings between foreign key columns and primary key columns of two entity beans when N relationships exist between the two entity beans.

5. The method as in claim 4 further comprising:

storing the default object-relational ("O/R") mapping in an extensible markup language ("XML") format.

6. The method as in claim 1 further comprising:

based on the analysis, generating a default database schema for the relational database to which each object of the object-oriented set of data is mapped.

7. The method as in claim 6 further comprising:

executing a structured query language ("SQL") command to generate a database table for each object mapped to a database table, wherein the SQL command includes an indication of a number of columns to use in the table, the number of columns corresponding to a number of persistent fields of the object.

8. The method as in claim 7 wherein the SQL command includes an indication of a data type to be implemented in each of the columns, the data type corresponding to a data type of each persistent data field mapped to each respective column.

9. A computer system including at least one processor comprising:

a deployment descriptor providing a representation of an object-oriented set of data;

object-relational ("O/R") generation logic to analyze specified characteristics of each object represented in the object-oriented representation; and based on the analysis, to generate a default object-relational ("O/R") persistence description that maps each object of the object-oriented representation to a relational database according to a set of default O/R mapping rules, and to store the default O/R persistence description in a storage medium;

wherein analyzing comprises identifying entity beans within the representation of the object-oriented set of data and wherein mapping comprises mapping each entity bean to a unique table in the relational database and further comprises identifying persistent fields for each entity bean within the representation of the object-oriented set of data and wherein mapping comprises mapping each persistent field to a column of the table mapped to the entity bean;

wherein the default O/R mapping rules specify that certain types of persistent fields are to be mapped only to certain types of database data types, wherein mapping comprises mapping each persistent field of a particular type to a column having a data type corresponding to the persistent field type;

wherein, according to the O/R massing rules, the O/R mapping generation logic maps a first dependent-value persistent field to a single column of type java.sql.Types.BLOB; and maps a second dependent-value persistent field to a set of columns; and wherein, as specified by the default O/R massing rules, the O/R massing generation logic maps the second dependent-value persistent field to a set of columns only when the second dependent-value persistent field's dependent-value class has an empty constructor and all of the second dependent-value persistent field's fields are public.

10. The system as in claim 9 wherein the persistent field type comprises java.lang.string and wherein the database data type comprises VARCHAR.

11. The system as in claim 9 wherein analyzing comprises identifying relationships between entity beans within the representation of the object-oriented set of data and wherein mapping comprises generating references between primary key columns and foreign key columns of related entity beans.

12. The system as in claim 11 wherein the O/R mapping generation logic generates N mappings between foreign key columns and primary key columns of two entity beans when N relationships exist between the two entity beans.

13. The system as in claim 12 wherein the O/R mapping generation logic stores the default O/R persistence description in an extensible markup language ("XML") format.

14. The system as in claim 9 further comprising:

database schema generation logic to generate a default database schema for the relational database to which each object of the object-oriented set of data is mapped.

15. The system as in claim 14 wherein the database schema generation logic executes a structured query language ("SQL") command to generate a database table for each object mapped to a database table, wherein the SQL command includes an indication of a number of columns to used in the table, the number of columns corresponding to a number of persistent fields of the object.

16. The system as in claim 15 wherein the SQL command includes an indication of a data type to be implemented in each of the columns, the data type corresponding to a data type of each persistent data field mapped to each respective column.

17. An article of manufacture including program code which, when executed by a machine, causes the machine to perform the operations of:

providing a representation of an object-oriented set of data;

analyzing specified characteristics of each object represented in the object-oriented representation; and based on the analysis, generating a default object-relational ("O/R") mapping that maps each object of the object-oriented representation to a relational database according to a set of default O/R mapping rules;

wherein analyzing comprises identifying entity beans within the representation of the object-oriented set of data and wherein mapping comprises mapping each entity bean to a unique table in the relational database and further comprises identifying persistent fields for each entity bean within the representation of the object-oriented set of data and wherein mapping comprises mapping each persistent field to a column of the table mapped to the entity bean;

wherein the default O/R mapping rules specify that certain types of persistent fields are to be mapped only to certain types of database data types, wherein mapping comprises mapping each persistent field of a particular type to a column having a data type corresponding to the persistent field type;

wherein the default O/R mapping rules specify that one type of persistent field is a dependent-value persistent field and wherein the O/R mapping rules specify different types of O/R mappings for different dependent-value persistent fields;

mapping a first dependent-value persistent field to a single column of type java.sql.Types.BLOB; and mapping a second dependent-value persistent field to a set of columns, wherein, as specified by the default O/R mapping rules, the second dependent-value persistent field is mapped to a set of columns only when the second dependent-value persistent field's dependent-value class has an empty constructor and all of the second dependent-value persistent field's fields are public.

18. The article of manufacture as in claim 17 wherein the persistent field type comprises java.lang.string and wherein the database data type comprises VARCHAR.

19. The article of manufacture as in claim 17 wherein analyzing comprises identifying relationships between entity beans within the representation of the object-oriented set of data and wherein mapping comprises generating references between primary key columns and foreign key columns of related entity beans.

20. The article of manufacture as in claim 19 comprising additional instructions to cause said machine to perform the operations of generating N mappings between foreign key columns and primary key columns of two entity beans when N relationships exist between the two entity beans.

21. The article of manufacture as in claim 20 comprising additional instructions to cause said machine to perform the operations of:

storing the default object-relational ("O/R") mapping in an extensible markup language ("XML") format.

22. The article of manufacture as in claim 17 comprising additional instructions to cause said machine to perform the operations of:

based on the analysis, generating a default database schema for the relational database to which each object of the object-oriented set of data is mapped.

23. The article of manufacture as in claim 22 comprising additional instructions to cause said machine to perform the operations of:

executing a structured query language ("SQL") command to generate a database table for each object mapped to a database table, wherein the SQL command includes an indication of a number of columns to use in the table, the number of columns corresponding to a number of persistent fields of the object.

24. The article of manufacture as in claim 23 wherein the SQL command includes an indication of a data type to be implemented in each of the columns, the data type corresponding to a data type of each persistent data field mapped to each respective column.

* * * * *